United States Patent Office 2,912,356
Patented Nov. 10, 1959

2,912,356

BICYCLIC ORGANIC COMPOUNDS CONTAINING A LARGE PROPORTION PER UNIT MASS OF HALOGEN

Louis Schmerling, Riverside, Ill., assignor, by mesne assignments, to Universal Oil Products Company, Des Plaines, Ill., a corporation of Delaware No Drawing. Application March 29, 1954
Serial No. 419,627

14 Claims. (Cl. 167—30)

This application is a continuation-in-part of my copending application Serial No. 100,756, filed June 22, 1949, now abandoned.

This invention relates to unsaturated, cyclic organic compounds containing halogen in their structure and useful as chemical intermediates and as the toxicant ingredient of insecticidal formulations. More specifically, the invention concerns chlorine-containing cyclic compounds and to insecticidal compositions containing the same, said compounds being formed by the process which involves the condensation of a hexahalocyclopentadiene with an aliphatic halogen-substituted olefin.

This invention provides a series of compounds characterized generally as bicyclic compounds substituted on multiple nuclear positions by chlorine and which may also contain halogen substituents on aliphatic side chains attached to the carbocyclic nucleus comprising the essential structure of the products. These compounds are the products of a Diels-Alder type condensation of a chlorodiene with an aliphatic halogen-substituted mono-olefin, the doubly bonded carbon atoms of which contain no more than a single halogen substituent on either carbon atom, and which preferably are olefins containing fewer than 6 carbon atoms per molecule. The halogens introduced into the structure of the product by virtue of halogen-substitution on both the diene and the mono-olefin reactants provide a compound of the following structure:

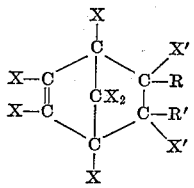

wherein X and X' are halogen, the products thus having a large proportion of halogen per unit mass in their structure which is believed to account for their insecticidal activity.

Thus, in accordance with one of its embodiments, the present invention concerns a bicyclic, halogen-containing compound represented by the general formula:

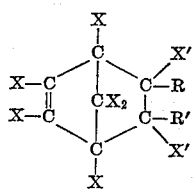

wherein X is a halogen selected from chlorine and bromine, X' is selected from the group consisting of hydrogen and a halogen of the group: fluorine, chlorine, and bromine and R and R' are each, independently selected from hydrogen, alkyl and haloalkyl, at least one of said X', R and R' substituents being selected from said halogen and haloalkyl substituents.

Another embodiment of the invention concerns a process for the production of a bicyclic, halogen-containing compound which comprises reacting a hexahalocyclopentadiene with a halogen-substituted mono-olefin selected from the fluoro-, bromo-, and chloro-substituted mono-olefins containing at least one halogen substituent per molecule and not more than one halogen radical on each of the doubly bonded carbon atoms of said mono-olefin, said reaction being effected at a temperature and pressure sufficient to result in a condensation of the Diels-Alder type between said halocyclopentadiene and said halo mono-olefin.

It will be understood that when referred to herein, in the claims or specifications, the term "cyclopentadiene" designates the conjugated ring system which may also be designated as 1,3-cyclopentadiene.

Although hexachlorocyclopentadiene is preferred in the present process as the dienic reactant because of its availability in commercial quantities and because of the highly effective insecticidal properties of its condensation products with halo-olefins, hexabromocyclopentadiene and mixed chloro- and bromo-hexahalocyclopentadienes may likewise be utilized in the reaction to provide bromine-substituted bicyclic compounds having molecular structures of similar structural characteristics to the condensation products of the corresponding hexachlorocyclopentadiene reactant. Thus, 2,3-dibromotetrachlorocyclopentadiene, 2,5-dibromotetrachlorocyclopentadiene, 5,5-dichlorotetrabromocyclopentadiene as well as other mixed bromo- and chloro-substituted cyclopentadienes may be utilized as the dienic reactant in the present process.

Halo-substituted mono-olefins capable of reacting in the present condensation reaction with the hexahalocyclopentadiene reactant may be selected from the aliphatic halo-olefins containing not more than about 6 carbon atoms per molecule. Aliphatic halo-olefins containing more than about 6 carbon atoms per molecule may also be employed but are generally less reactive, forming relatively low yields of the desired condensation product and for this reason are not the preferred halo-olefin reactants utilizable herein. Accordingly, the shorter chain length compounds within the above class of halo-olefins are preferred, although the variation in properties of the condensation product resulting from the use of the longer chain halo-olefins may compensate for the usually lower yield accompanying their use. The volatility of the resultant product, for example, is usually dependent upon its molecular weight and when a product having low volatility is especially desired in a particular application, such as a high degree of retentivity on the surface to which the insecticide is applied, advantage may be taken of the fact that the longer chain halo-olefins yield products having relatively higher boiling points than do the short chain halo-olefins and thus may be the preferred reactants for the production of such compositions. The preferred halo-olefins utilizable in the present condensation process, on the basis of yield of product obtained therefrom and the relative ease of preparation, are the halogen-substituted ethylenes such as vinyl chloride, vinyl bromide, and vinyl fluoride; the allyl halides such as allyl chloride and bromide; 1-chloropropene, 2-chloropropene; 1,2-dichloroethylene (both cis- and trans-) 1,2-dichloro-1-propene, 1,3-dichloropropene, 1-chloro-3-bromopropene, 1-chloro-2,3-dibromopropene, 2-chloro-3,3-dibromo-1-butene, 2,3-dichloro-2-butene, 1-chloro-3,3,3-trifluoromethyl-2-methylpropene, 2,3-dichloro-3-methyl-4,4-dibromo-1-butene, and other mono and poly halogen-substituted mono-olefins. It is to be noted however, that only halo-olefins containing no more than a single halogen substitutent on either of the doubly bonded carbon atoms of the olefin are suitable for use as the mono-olefin reactant in the present process, the olefins containing poly-halogen substituted ethylenic linkages being inoperable presumably by virtue of steric hindrance or other factors which make such polyhaloethylenes non-reactive in the present Diels-Alder type of condensation reaction with hexahalocyclopentadienes.

The production of the present bicyclic, nuclearly halogen-substituted compounds is effected by the thermal condensation of the hexahalocyclopentadiene reactant with the halogen-substituted mono-olefin, preferably at a pressure sufficient to maintain at least one of the reactants in substantially liquid phase. Although the use of approximately equimolecular ratios of the reactants generally results in a substantial yield of the desired condensation product, it is usually preferred to maintain a stoichiometric excess of the halo-olefin component in the reaction mixture of from about 1.5 to 1 to about 10 to 1 molecular proportions of the halo-olefin to the hexahalocyclopentadiene reactant in order to consume the latter component substantially to completion during the reaction. The excess of the halo-olefin reactant provides an effective diluent of the reaction mixture, enabling the rate of the resulting exothermic reaction to be controlled within desirable limits. In thus substantially removing the hexahalocyclopentadiene component from the reaction mixture by virtue of its substantially complete condensation with the halo-olefin reactant, the subsequent problem of separating the product from the reaction mixture is simplified, since the excess of the halo-olefin, usually the component of the reaction mixture having lowest boiling point, may be removed therefrom merely by distilling the same from the mixture, leaving a residue consisting primarily of product. The latter residue may be thereafter purified, for example, by distillation, crystallization, extraction, or by other means well known to the art or utilized directly without further treatment for the preparation of an insecticidal composition. The product may be additionally treated, for example, by reaction with a metal to effect dehalogenation, or with an alkaline material to effect dehydrohalogenation. The compounds may also be halogenated, if desired, to introduce additional halogen substituents into their structure.

The condensation reaction provided herein, generally characterized as of the Diels-Alder type, is effected at a temperature of from about 100° to about 300° C., preferably at a temperature of from about 150° C. to about 250° C. Use of superatmospheric pressures, generally in excess of about 2 atmospheres and preferably from about 10 to about 100 atmospheres is often advantageous. In order to provide such pressures within the reaction vessel, a suitable inert gas, such as nitrogen, carbon dioxide, etc., may be charged into the reaction vessel at the desired pressure and the reaction mixture heated at such pressure until the optimum degree of condensation has occurred.

The physical properties of the present bicyclic condensation products and the effects they have on entomological forms of life make them particularly desirable as insecticides and insect repellants, the compounds having many of the features desired of materials for this purpose. They are, for example, toxic to insects which are destructive of plant life and property normally subject to insect infestation, their toxic effects being manifested by contact of the poison with the insect. The insecticides comprising the present compounds are thus effective against chewing as well as sucking types of insects. The compounds are sufficiently volatile such that when applied to plant life intended for subsequent human consumption, the plant when harvested and after allowing a reasonable time for evaporation of the applied insecticide therefrom, retains none of the toxicant to prevent use of the plant for food purposes. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water or combined with an oil and emulsified with water by the addition of an emulsifying agent, such as a surface active agent, to the mixture of components. The latter solvents and dispersants may also be employed for the specific purpose of reducing the concentration of insecticide to the desired level in a specific insecticide, formulation. The particular formulation of active components in combination with the solvent or dispersant will depend upon its application. Compositions containing as high as 20% of active component may be preferred in some instances where deep penetration of the insecticide is desired, as in the treatment of fibrous material, such as wood for extinction of a particular infestation, such as wood termites. For other purposes, the required concentration of active components in the formulation may be as low as 0.1%, as for example, in the treatment of fabrics for destroying moth larvae. In utilizing the present insecticidal compounds against most insects, a composition containing from about 1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as butane, Freon, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, and alcohol, etc., and the resulting solution atomized by a suitable spraying device.

This invention is further described with reference to the following illustrative examples, which, although indicative of typical representative compositions and processes for manufacture of the same, are nevertheless not intended to limit the generally broad scope of the invention in strict accordance therewith.

*Example I*

Hexachlorocyclopentadiene was reacted with 1,3-dichloropropene to form a crystalline compound, 5-chloromethyl-1,2,3,4,6,7,7-heptachlorobicyclo (2.2.1)-2-heptene, in accordance with the following reaction. 55 grams of hexachlorocyclopentadiene and 30 grams of 1,3-dichloropropene were charged into a glass-lined pressure autoclave with nitrogen at 50 atmospheres and heated for a period of five hours from an initial temperature of 24° C. to a final temperature of 180° C. while the autoclave was slowly rotated. The reaction mixture was further heated for a period of 1 hour at 180° C. and thereafter cooled to room temperature and then distilled under reduced pressure. Besides unreacted 1,3-dichloropropene and hexachlorocyclopentadiene, there was obtained 20 g. of the condensation product, corresponding to a 26% yield based upon the quantity of hexachlorocyclopentadiene charged or an 85% yield based on the recovered diene. The product, a crystalline material, melting at 71–73° C., boiled at a temperature of 160 to 162° C. at 5 mm. mercury pressure. A carbon, hydrogen and chlorine determination on the product indicated the following composition: Found: C: 25.15; H: 1.18; Cl: 73.74. Calculated for $C_8H_4Cl_8$: C: 25.02; H: 1.05; Cl: 73.93.

*Example II*

A condensation reaction occurred when hexachlorocyclopentadiene was heated with vinyl bromide at the following reaction conditions. 100 grams of hexachlorocyclopentadiene and 52 grams of vinyl bromide were charged into a glass-lined rotating pressure autoclave and heated for 4 hours at a temperature of 200° to 220° C. After cooling, 83 grams (60% of the theory) of crystalline product (melting at 146–148° C.) were recovered which is believed to be 5-bromo-1,1,2,3,4,7,7-hexachlorobicyclo (2.2.1)-2-heptene. Analysis: Found: C, 22.66; H, 1.11. Calculated for $C_7H_3Cl_6Br$: C, 22.14; H, 0.80.

*Example III*

The fact that the presence of more than one halogen substituent on the ethylenic carbon atoms of the halo-mono-olefin reactant effectively inhibits reactivity of the halo-olefin with the chloro-diene was illustrated in the following run, representing an attempted condensation of hexachlorocyclopentadiene with hexachloropropene. 13 grams of hexachlorocyclopentadiene and 11 grams of hexachloropropene were heated at 222° C. for 9 hours in a rotating pressure autoclave, the reaction mixture thereafter being cooled and subjected to distillation for the purpose of recovering the condensation product, if any, therefrom. No detectable quantity of condensation product was obtained, however, as indicated by the absence of any fraction boiling above hexachlorocyclopentadiene in the distillation of the reaction mixture from the above attempted condensation.

*Example IV*

1,2,3,4,5,6,7,7-octachlorobicyclo (2.2.1)-heptene, boiling at 155–160° C. at 6 mm. pressure, was obtained in 28% of theoretical yield by heating hexachlorocyclopentadiene with trans-dichloroethylene at 200° C. for 6 hours in a rotating pressure autoclave, the reaction mixture being heated gradually to the 200° C. temperature of the above period of 6 hours. The product is a white crystalline compound melting at about 190° C. Analysis: Found: C, 23.38; H, 0.88; Cl, 76.37. Calculated for $C_7H_2Cl_8$: C, 22.74; H, 0.54; Cl, 76.72.

Similarly, the reaction of hexachlorocyclopentadiene with cis-dichloroethylene resulted in a 46% yield of crystalline adduct, melting at 198° C. Analysis: Found: C, 22.96; H, 0.86; Cl, 76.32.

On the other hand, no condensation occurred when hexachlorocyclopentadiene was heated with trichloroethylene or tetrachloroethylene at temperatures up to 250° C., the di-halogen substitution on one of the carbon atoms of the ethylene linkage inhibiting condensation, as heretofore indicated.

*Example V*

A condensation reaction, with the formation of a crystalline adduct may also be obtained by reacting 5,5-dibromo-1,2,3,4-tetrachlorocyclopentadiene with 2,3-dichloro-2-butene at 210° C., the reaction reaching an equilibrium state within about 4 hours.

The yield of adduct gradually tends to decrease as the chain length of the halo-mono-olefin is increased beyond 6 carbon atoms per molecule, as indicated by the series of reactions wherein hexachlorocyclopentadiene is successively reacted at temperatures of from 200° to 230° C. with 2,3-dichloro-1-propene, 2,3-dichloro-1-butene, 2,3-dichloro-1-pentene, and 2,3-dichloro-1-hexene.

I claim as my invention:

1. A bicyclic halogen-containing compound represented by the following formula:

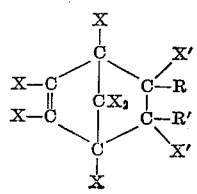

in which X is a halogen selected from the group consisting of chlorine and bromine, X' is a substituent selected from the group consisting of hydrogen and a halogen of the group: fluorine, chlorine, and bromine and R and R' are substituents each independently selected from hydrogen, alkyl and monohaloalkyl, at least one of said X', R, and R' substituents being selected from said halogen and monohaloalkyl substituents.

2. A bicyclic halogen-containing compound as defined in claim 1 further characterized in that at least one of said X' substituents is halogen.

3. A process for the production of a bicyclic halogen-containing compound which comprises reacting a hexahalocyclopentadiene in which the halogens are selected from the group consisting of chlorine and bromine with a halogen-substituted mono-olefin selected from the fluoro-, bromo- and chloro-substituted mono-olefins containing at least one halogen substituent per molecule and not more than one halogen substituent on each of the carbon atoms of the ethylenic linkage of said mono-olefin, said reaction being effected at a temperature and pressure sufficient to result in a condensation of the Diels-Alder type between said hexahalocyclopentadiene and said halo-mono-olefin.

4. The process of claim 3 further characterized in that said hexahalocyclopentadiene is hexachlorocyclopentadiene.

5. The process of claim 3 further characterized in that said reaction is effected at a temperature of from about 100° to about 300° C. and at a pressure sufficient to maintain at least one of said hexahalocyclopentadiene and said halomono-olefin in substantially liquid phase.

6. An insecticidal composition comprising an inert carrying agent and an insecticide suspended therein, said insecticide having the following general formula:

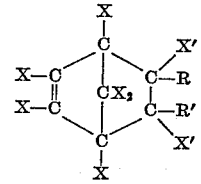

in which X is a halogen selected from the group consisting of chlorine and bromine, X' is a substituent selected from the group consisting of hydrogen and a halogen of the group: fluorine, chlorine, and bromine and R and R' are substituents each independently selected from hydrogen, alkyl and monohaloalkyl, at least one of said X', R and R' substituents being selected from said halogen and monohaloalkyl substituents.

7. 5-chloromethyl-1,2,3,4,6,7,7-heptachlorobicyclo (2.2.1)-2-heptene.

8. 5-bromo-1,1,2,3,4,7,7-hexachlorobicyclo (2.2.1)-2-heptene.

9. 1,2,3,4,5,6,7,7-octachloro-bicyclo (2.2.1)-2-heptene.

10. 1,2,3,4,5,6,7,7 - octachloro - 5,6 - dimethylbicyclo (2.2.1)-2-heptene.

11. The method which comprises reacting a vinyl halide with hexachlorocyclopentadiene in a Diels-Alder manner to form their equi-molar adduct.

12. An insecticide comprising 5-chloromethyl-1,2,3,4,7,7-hexachlorobicyclo(2.2.1) - 2 - heptene, said compound being the Diels-Alder adduct of hexachlorocyclopentadiene and allyl chloride.

13. The method which comprises reacting vinyl chloride with hexachlorocyclopentadiene in a Diels-Alder manner to form their equi-molar adduct.

14. The equi-molar Diels-Alder adduct of hexachlorocyclopentadiene and a vinyl halide.

(References on following page)

References Cited in the file of this patent

UNITED STATES PATENTS

| | | |
|---|---|---|
| 2,336,208 | Alder et al. | Dec. 7, 1943 |
| 2,352,606 | Alder et al. | July 4, 1944 |
| 2,519,190 | Hyman | Aug. 15, 1950 |
| 2,597,016 | McBee et al. | May 20, 1952 |

FOREIGN PATENTS

| | | |
|---|---|---|
| 614,931 | Great Britain | Dec. 30, 1948 |
| 624,176 | Great Britain | May 30, 1949 |

OTHER REFERENCES

Plummer: "Dow Diamond," volume 10, pages 1-2 (1947).

Prill: "Journal American Chemical Society," volume 69, pages 62-3 (1947).

Krynitsky et al.: "Journal American Chemical Society," volume 69, pages 1918-20 (1947).